(12) United States Patent
Ahn et al.

(10) Patent No.: US 9,009,621 B2
(45) Date of Patent: Apr. 14, 2015

(54) METHOD FOR PROVIDING USER INTERFACE FOR CONTROLLING GAME

(75) Inventors: Hyun Suk Ahn, Seoul (KR); Yu Kyoung Lim, Seoul (KR); Yoon Ji Park, Seoul (KR); Sung Hwan Yoon, Seoul (KR); Jae Sung Park, Seoul (KR); Young Jin Ahn, Gyeonggi-Do (KR)

(73) Assignee: Nexon Korea Corporation, Seoul (KR)

( * ) Notice: Subject to any disclaimer, the term of this patent is extended or adjusted under 35 U.S.C. 154(b) by 823 days.

(21) Appl. No.: 12/691,012

(22) Filed: Jan. 21, 2010

(65) Prior Publication Data

US 2011/0077083 A1   Mar. 31, 2011

(30) Foreign Application Priority Data

Sep. 29, 2009   (KR) .................. 10-2009-0092321

(51) Int. Cl.
*G06F 3/048* (2013.01)
*G06F 3/0484* (2013.01)
*A63F 13/40* (2014.01)
*G06F 3/0488* (2013.01)
*G06F 3/038* (2013.01)

(52) U.S. Cl.
CPC ............ *G06F 3/04845* (2013.01); *A63F 13/10* (2013.01); *G06F 3/0488* (2013.01); *G06F 3/038* (2013.01); *A63F 2300/1075* (2013.01); *A63F 2300/204* (2013.01)

(58) Field of Classification Search
CPC ...................................................... G06F 3/038
USPC .................. 715/768, 769, 790, 702; 345/173
See application file for complete search history.

(56) References Cited

U.S. PATENT DOCUMENTS

| | | | | |
|---|---|---|---|---|
| 6,037,937 | A * | 3/2000 | Beaton et al. ................. | 715/764 |
| 6,704,032 | B1 * | 3/2004 | Falcon et al. ................. | 715/746 |
| 2002/0191029 | A1 * | 12/2002 | Gillespie et al. .............. | 345/810 |
| 2005/0257169 | A1 * | 11/2005 | Tu ................................. | 715/810 |
| 2008/0163053 | A1 * | 7/2008 | Hwang et al. ................. | 715/702 |
| 2008/0204424 | A1 * | 8/2008 | Jin et al. ........................ | 345/173 |
| 2010/0037168 | A1 * | 2/2010 | Thayne et al. ................ | 715/769 |
| 2010/0077334 | A1 * | 3/2010 | Yang et al. .................... | 715/769 |
| 2010/0214250 | A1 * | 8/2010 | Gillespie et al. .............. | 345/173 |
| 2011/0066962 | A1 * | 3/2011 | Nash et al. .................... | 715/768 |

FOREIGN PATENT DOCUMENTS

| | | |
|---|---|---|
| JP | 2004-532477 A | 10/2004 |
| JP | 2005-062978 A | 3/2005 |
| JP | 2006-140700 A | 1/2006 |
| JP | 2009-169820 A | 7/2009 |
| WO | 02/093542 A1 | 11/2002 |

OTHER PUBLICATIONS

Japanese Office action for 2010-112008 dated Feb. 4, 2014.

* cited by examiner

*Primary Examiner* — William Titcomb
(74) *Attorney, Agent, or Firm* — Pearne & Gordon LLP

(57) ABSTRACT

Disclosed is a user interface providing method for controlling a game play in a portable device. A user interface providing technology determines whether a received first touch input is a touch input for setting a GUI, determines a GUI setting mode, and activating at least one GUI element for controlling the game play in response to the GUI setting mode.

19 Claims, 15 Drawing Sheets

METHOD FOR PROVIDING USER INTERFACE FOR CONTROLLING GAME

CROSS-REFERENCE TO RELATED APPLICATION

This application claims the benefit of Korean Patent Application No. 10-2009-0092321, filed on Sep. 29, 2009, in the Korean Intellectual Property Office, the disclosure of which is incorporated herein by reference.

BACKGROUND

1. Field of the Invention

Example embodiments relate to technologies that provide a user interface (UI) to control a game play in a portable device including a touch screen display.

2. Description of the Related Art

Recently, a number of users using a portable device including a touch screen display, such as a touch phone, has increased in a mobile game market, and thus, a market share has also increased.

A mobile touch game obtains positive responses from many game users due to a user interface (UI) that moves a character to a specific point and encourages an immediacy of a touch, an immediacy of an operation method, and the like. However, a portable device including a touch screen display for a mobile game, such as a touch phone for a mobile game, has a small user interface, thereby being difficult in touching and inputting a key with a finger of a game user. Also, a reaction speed of the touch phone may be slow, thereby having a difficulty in playing the game.

Also, due to limitations of the UI, the portable device including the touch screen display may not perform a fine control in a mobile touch game play. Also, the UI may be in disarray, thereby being difficult and complex to perform touching, and may cover a screen and may cause a touch mistake, thereby providing a disastrous effect to a game play.

Accordingly, there may be a need of a UI that extends a touch recognition area based on an inaccuracy and an exceptional situation that may occur in a touch input scheme for a game play in the portable device including the touch screen display, and secures a convenience and an immediacy of operation in consideration of a game user.

SUMMARY

According to an aspect of the present invention, there is provided a method of providing a user interface to control a game play in a portable device including a touch screen display, the method including receiving a first touch input, determining whether the received first touch input is a touch input for a graphical user interface (GUI) setting, determining a GUI setting mode when the received first touch input is the touch input for the GUI setting, and activating at least one GUI element to be used for controlling the game play in response to the determined GUI setting mode.

The at least one GUI element may be at least one input key used for controlling the game play on the touch screen display.

The GUI setting mode may be an editing mode that sets a transparency of the at least one input key that is displayed by being overlapped on a game graphic image. In this instance, the activating may include displaying a transparency setting element, receiving a second touch input for setting the transparency, and activating the at least one input key by updating a transparency of the at least one input key in response to the received second touch input.

The activating of the at least one input key may include displaying a change of the transparency level from a first state to a second state. The change from the first state to the second state may be controlled to be in proportion to a number of the second touch inputs.

The GUI setting mode may be an editing mode that sets an ergonomic space arrangement with respect to the at least one input key displayed by being overlapped on a game graphic image. In this instance, the activating of the at least one GUI element may include receiving the second touch input for the ergonomic space arrangement, and activating the at least one input key by updating a space arrangement of the at least one input key in response to the received second touch input.

The second touch input may be a drag and drop with respect to the at least one input key. The activating of the at least one input key may display a change from a first space arrangement to a second space arrangement in response to the drag and drop.

The change from the first space arrangement to the second arrangement may be controlled to be in proportion to a speed of the second touch input.

The GUI setting mode may be an editing mode that adjusts a size of the at least one input key displayed by being overlapped on a game graphic image. In this instance, the activating may include receiving the second touch input for adjusting the size, and activating the at least one input key by updating a size of the at least one input key, in response to the second touch input.

The activating may display a change of the size of the at least one input key from a first size to a second size.

The GUI setting mode may be a setting mode selected with respect to a transparency, an ergonomic space arrangement, a size, or a combination thereof with respect to the at least one input key displayed by being overlapped on a game graphic image. In this instance, the GUI setting mode may include a one-hand mode or a two-hand mode of the ergonomic space arrangement with respect to the at least one input key on the touch screen display that is based on user's convenience of inputting a key.

Additional aspects, features, and/or advantages of the invention will be set forth in part in the description which follows and, in part, will be apparent from the description, or may be learned by practice of the invention.

EFFECT

Example embodiments of the present invention may enable a user to set a graphical user interface (GUI) element based on an inaccuracy and an exceptional situation for a game play in a portable device including a touch screen.

Example embodiments of the present invention may provide a user interface that secures a game user for a convenience and an immediacy of operation by setting a GUI element for a game play.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
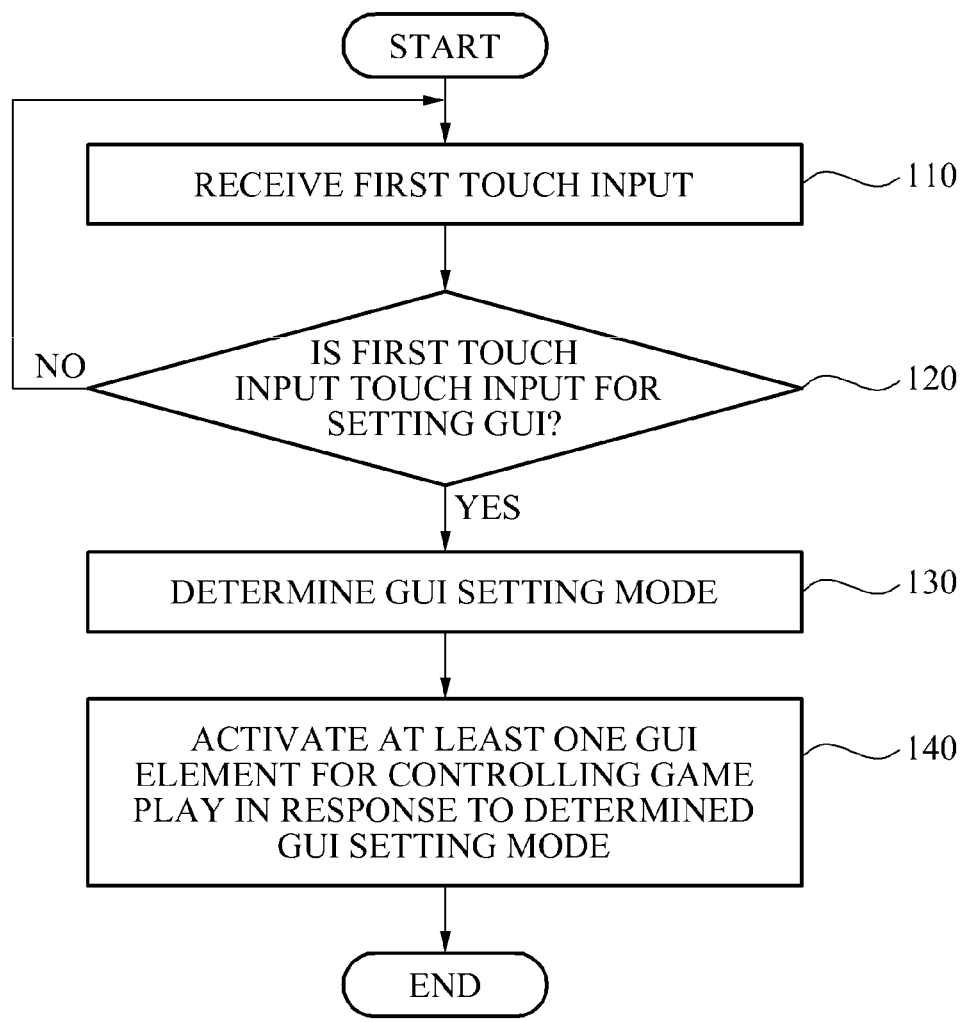
FIG. 1 is a flowchart illustrating a user interface providing method to control a game play in a portable device including a touch screen display according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a flowchart illustrating a user interface providing method to control a game play in a portable device including a touch screen display according to an embodiment of the present invention.

Referring to FIG. 1, the user interface providing method according to an embodiment of the present invention may receive a first touch input in operation 110.

The user interface providing method may determine whether the received first touch input is a touch input for setting a graphical user interface (GUI) in operation 120.

When the received first touch input is the touch input for setting the GUI, the user interface providing method may determine a GUI setting mode in operation 130, and may activate at least one GUI element used for controlling a game play in response to the determined GUI setting mode in operation 140.

Depending on example embodiments, the GUI setting mode may be an editing mode that sets a transparency of at least one input key displayed by being overlapped on a game graphic image of the touch screen display.

Also, depending on example embodiments, the at least one GUI element may be displayed on the game graphic image.

When the GUI setting mode is determined as the editing mode that sets a transparency of the at least one input key, the user interface providing method may display a transparency setting element, may receive a second touch input for setting the transparency, may update a transparency of the at least one input key in response to the received second touch input, and may activate the at least one input key in operation 140.

Depending on examples, the GUI setting mode may be an editing mode that sets an ergonomic space arrangement of the at least one input key displayed by being overlapped on the game graphic image.

When the GUI setting mode is determined as the editing mode that sets the ergonomic space arrangement of the at least one input key, the user interface providing method may receive a second touch input for the ergonomic space arrangement, may update a space arrangement of the at least one input key in response to the second touch input, and may activate the at least one input key. Depending on example embodiments, the second touch input may be a drag and drop with respect to the at least one input key.

Depending on example embodiments, the GUI setting mode may be an editing mode that may adjust a size of the at least one input key displayed by being overlapped on the game graphic image.

When the GUI setting mode is determined as the editing mode that adjusts the size of the at least one input key, the user interface providing method may receive a second touch input for adjusting the size, may update the size of the at least one input key in response to the received second touch input, and may activate the at least one input key.

Depending on example embodiments, the GUI setting mode may be a setting mode selected with respect to the transparency, the ergonomic space arrangement, the size, and a combination thereof with respect to the at least one input key displayed by being overlapped on a game graphic image.

Depending on example embodiments, the selected setting mode may include a one-hand mode or a two-hand mode of the ergonomic space arrangement with respect to the at least one input key on the touch screen display that is based on user's convenience of inputting a key.

When the GUI setting mode is determined as the setting mode selected with respect to the transparency, the ergonomic space arrangement, the size, or the combination thereof with respect to the at least one input key, the user interface providing method may activate the at least one input key in response to the selected setting mode in operation 140.

Conversely, when the received first touch input is not the touch input for setting the GUI, the user interface providing method may proceed with an operation 110 and may proceed with a next operation only when in the GUI setting mode.

The at least one GUI element according to an embodiment of the present invention may be at least one input key used for controlling the game play on the touch screen display.

Depending on example embodiments, the at least one input key may be a virtual input key, such as a direction key and a number key displayed by being overlapped on the game graphic image.

Hereinafter, a process of determining the GUI setting mode and activating the GUI element, when the received touch input is the touch input for setting the GUI, will be described with reference to FIG. 2.

Figure 2:
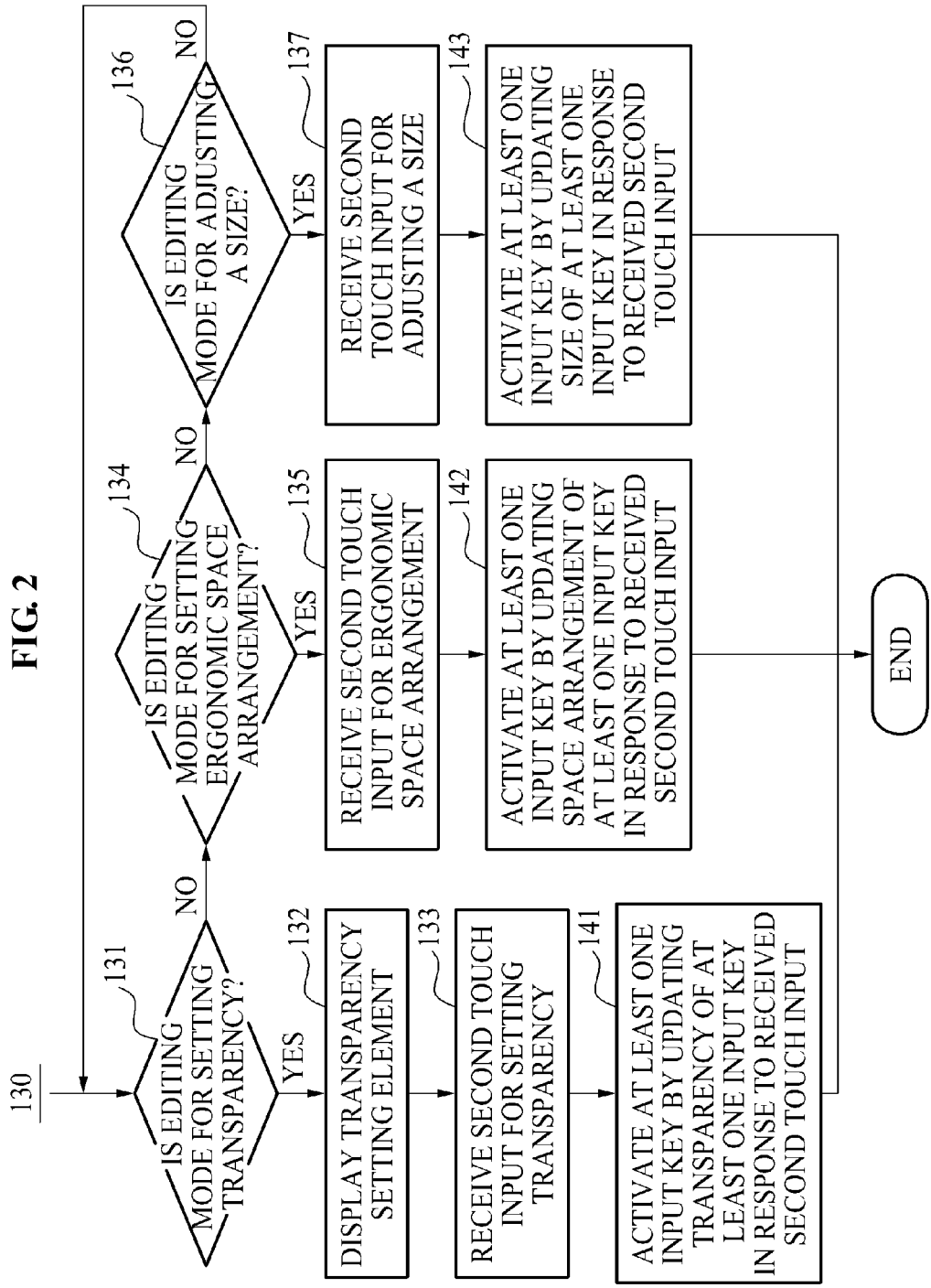
FIG. 2 is a flowchart illustrating a user interface providing method including a process of determining a graphical user interface (GUI) setting mode and activating a GUI element when a received touch input is a touch input for setting a GUI according to an embodiment of the present invention.

FIG. 2 is a flowchart illustrating a user interface providing method including a process of determining a GUI setting mode and activating a GUI element when a received touch input is a touch input for setting a GUI according to an embodiment of the present invention.

Referring to FIG. 2, when the received first touch input of FIG. 1 is determined as a touch input for setting a GUI, the user interface providing method according to an embodiment of the present invention may determine the GUI setting mode and activate at least one GUI element.

The user interface providing method may determine whether the GUI setting mode is an editing mode that sets a transparency of at least one input key displayed by being overlapped on a game graphic image of a touch screen display based on the determination of the GUI setting mode in operation 131.

Depending on example embodiments, the at least one GUI element may be displayed on the game graphic image.

Depending on example embodiments, the at least one GUI element may be at least one input key for controlling the game play on the touch screen display.

When the GUI setting mode is the editing mode that sets the transparency of the at least one input key, the user interface providing method may display a transparency setting element in operation 132.

Depending on example embodiments, the user interface providing method may receive a second touch input for setting the transparency in operation 133.

Depending on example embodiments, the user interface providing method may update the transparency of the at least one input key in response to the received second touch input and may activate the at least one input key in operation 141.

Depending on example embodiments, activating of the at least one input key in operation 141 may be an operation of displaying a change of a transparency from a first state to a second state, and the change from the first state to the second state may be controlled to be in proportion to a number of second touch inputs. That is, a level of the transparency may be controlled based on a second touch input of the displayed transparency setting element.

Hereinafter, a process of adjusting the transparency of the GUI element on the touch screen display according to an embodiment of the present invention with reference to FIGS. 3A through 3C.

Figure 3A:
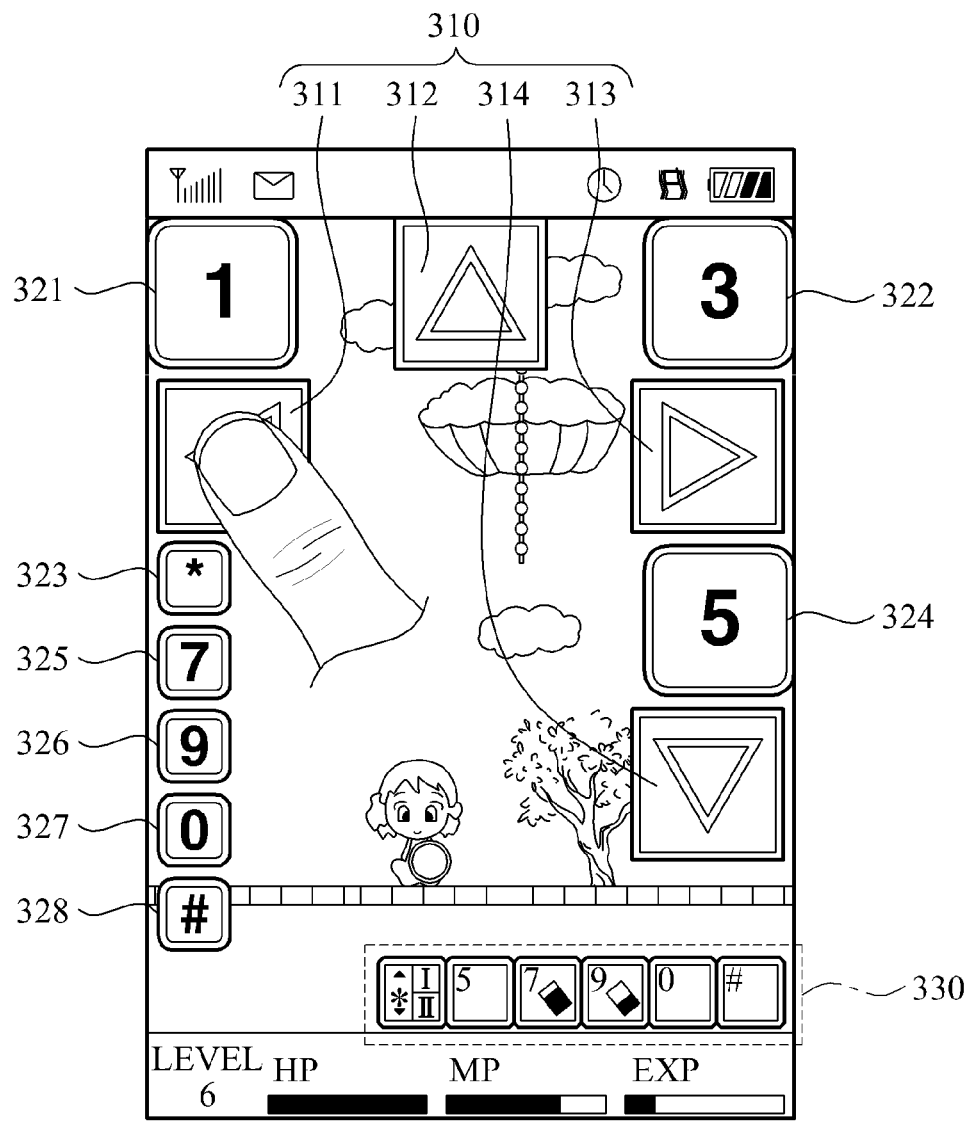
FIGS. 3A through 3C are diagrams illustrating a process of providing a user interface (UI) of when a GUI setting mode is an editing mode that sets a transparency of at least one input key according to an embodiment of the present invention.
Figure 3B:
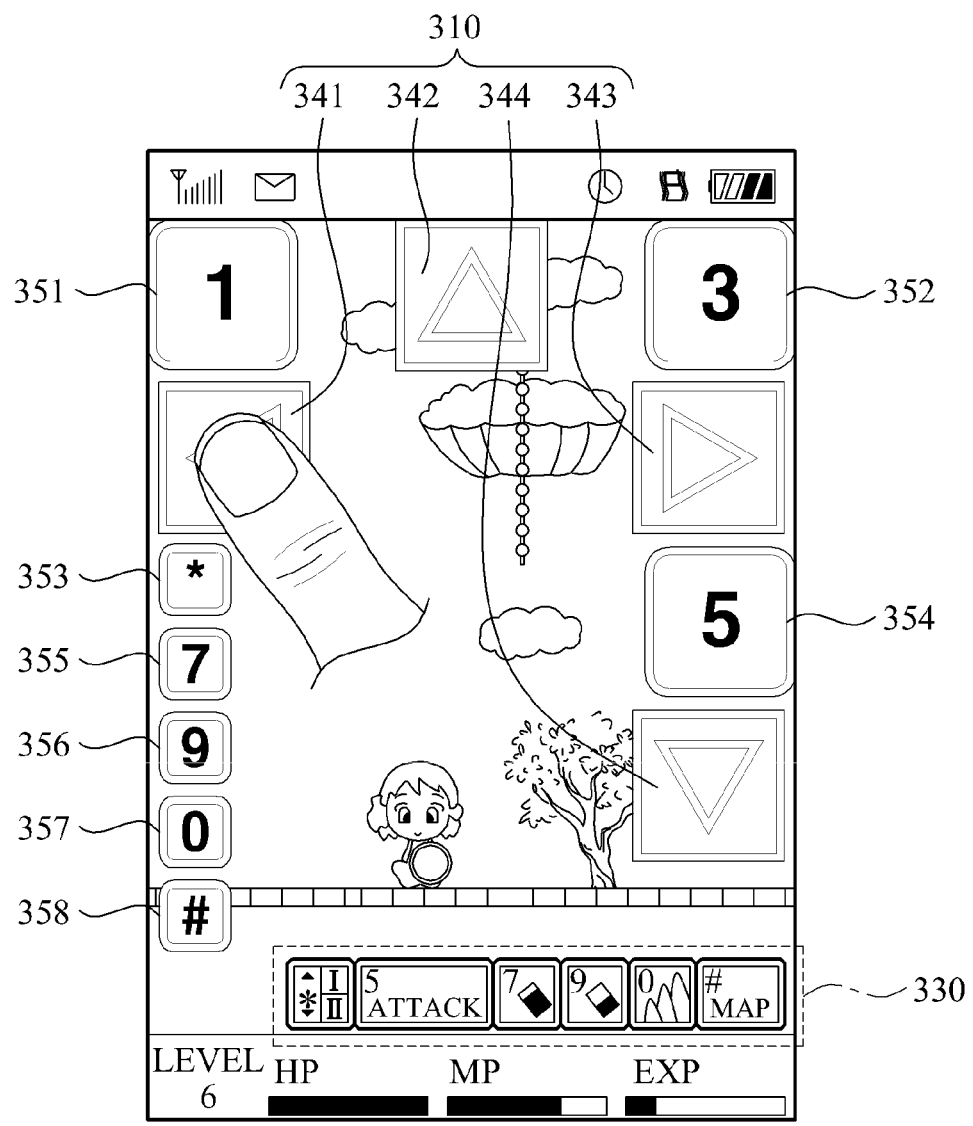
Figure 3C:
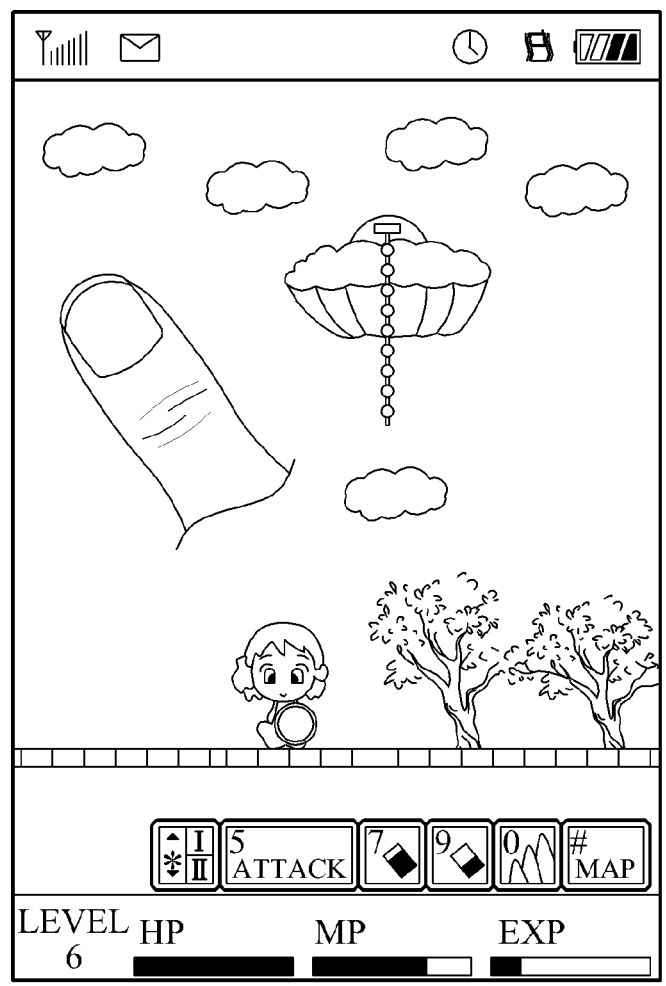

FIGS. 3A through 3C are diagrams illustrating a process of providing a user interface (UI) of when a GUI setting mode is an editing mode that sets a transparency of at least one input key according to an embodiment of the present invention.

At least one GUI element according to an embodiment may be displayed on a game graphic image. Depending on example embodiments, the at least one GUI element may be at least one input key used for controlling the game play on the touch screen display.

With reference to FIG. 3A, the at least one GUI element may include at least one input key for controlling the game play including direction keys 311, 312, and 313, and operation keys 321 through 328 for a game play for each game contents.

Depending on example embodiments, the at least one GUI element may include a GUI element 330 for describing operations of the operation keys 321 through 328 to the game user.

When the GUI setting mode is an editing mode that sets a transparency of the at least one input key, the user interface providing method according to an embodiment of the present invention may receive a second touch input for setting the transparency, may update the transparency of the at least one input key in response to the received second touch input, and may activate the at least one input key.

That is, the user interface providing method may update and activate the direction keys 311, 312, and 313 and operation keys 321 through 328 by setting transparency of the direction keys 311, 312, and 313, and transparency of the operation keys 321 through 328 in response to the received second touch input.

Referring to FIGS. 3B through 3C, the process of updating and activating the direction keys 311, 312, and 313 and operation keys 321 through 328 by setting the transparency of the direction keys 311, 312, and 313 and the transparency of the operation keys 321 through 328 may be an operation of displaying a change from the first state to the second state, and the change from the first state to the second state may be controlled to be in proportion to the number of second touch inputs.

That is, in FIGS. 3A through 3C, the user interface providing method including the change from the first state to the second state may include a change from FIG. 3A to FIG. 3B, a change from FIG. 3A to FIG. 3C, and a change from FIG. 3B to FIG. 3C, and depending on example embodiments, an inverse thereof may be possible.

Depending on example embodiments, although is it not illustrated, the user interface providing method may display a transparency setting element that sets a transparency, and may control a level of the transparency based on a degree of the second touch input with respect to the displayed transparency setting element. That is, the transparency of FIGS. 3A through 3C may be set based on the number of second touch inputs.

Particularly, the direction keys 311, 312, and 313 and operation keys 321 through 328 in a first state of FIG. 3A may be respectively activated as direction keys 341, 342, and 343 and operation keys 351 through 358 in a second state of FIG. 3B, based on setting of transparency. Depending on example embodiments, the direction keys 341, 342, and 343 and the operation keys 351 through 358 in a first state of FIG. 3B may be respectively activated as direction keys (not illustrated) and operation keys (not illustrated) in a second state of FIG. 3C which is completely transparent.

A UI that easily operates a game play may be provided by preventing a game graphic image from being covered by the GUI element, such as the direction key and the operation key.

Referring again to FIG. 2, the user interface providing method may determine whether the GUI setting mode is an editing mode that sets an ergonomic space arrangement of the at least one input key displayed by being overlapped on the game graphic image, based on the determination of the GUI setting mode in operation 134.

When the GUI setting mode is determined as the editing mode that sets the ergonomic space arrangement with respect to the at least one input key, the user interface providing method may receive a second touch input for arranging the ergonomic space arrangement in operation 135.

Depending on example embodiments, the at least one input key may be activated by updating a space arrangement of the at least one input key in response to the received second touch input in operation 142.

Depending on example embodiments, the second touch input may be a drag and drop with respect to the at least one input key, and a change from a first space arrangement to a second space arrangement may be displayed in response to the drag and drop in operation 142. Depending on example embodiments, the change from the first space arrangement to the second space arrangement may be controlled to be in proportion to a speed of the second touch input.

Hereinafter, a process of rearranging a space of GUI element on the touch screen display according to an embodiment of the present invention will be described with reference to FIGS. 4A and 4B.

Figure 4A:
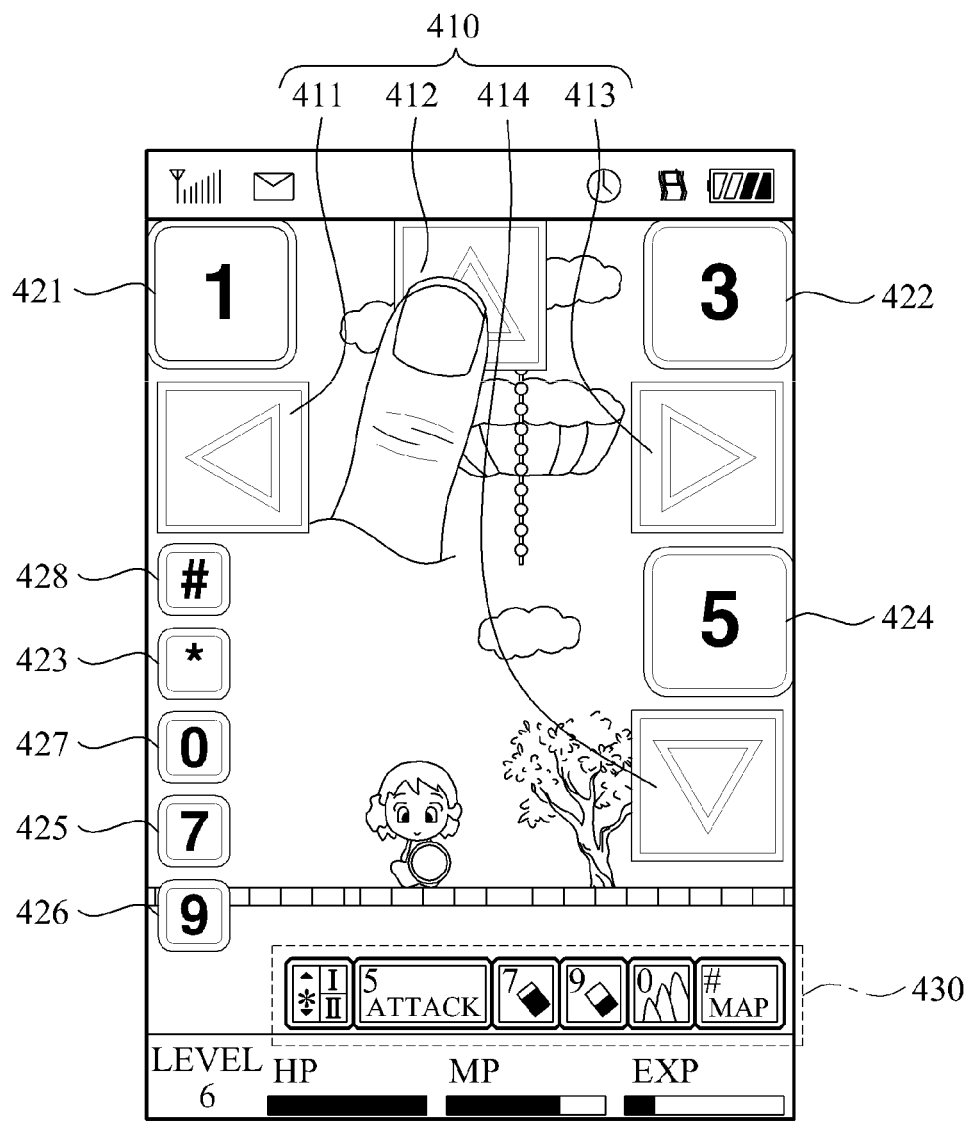
FIGS. 4A and 4B are diagrams illustrating a process of providing a UI of when a GUI setting mode is an editing mode that sets an ergonomic space arrangement of at least one input key according to an embodiment of the present invention.
Figure 4B:
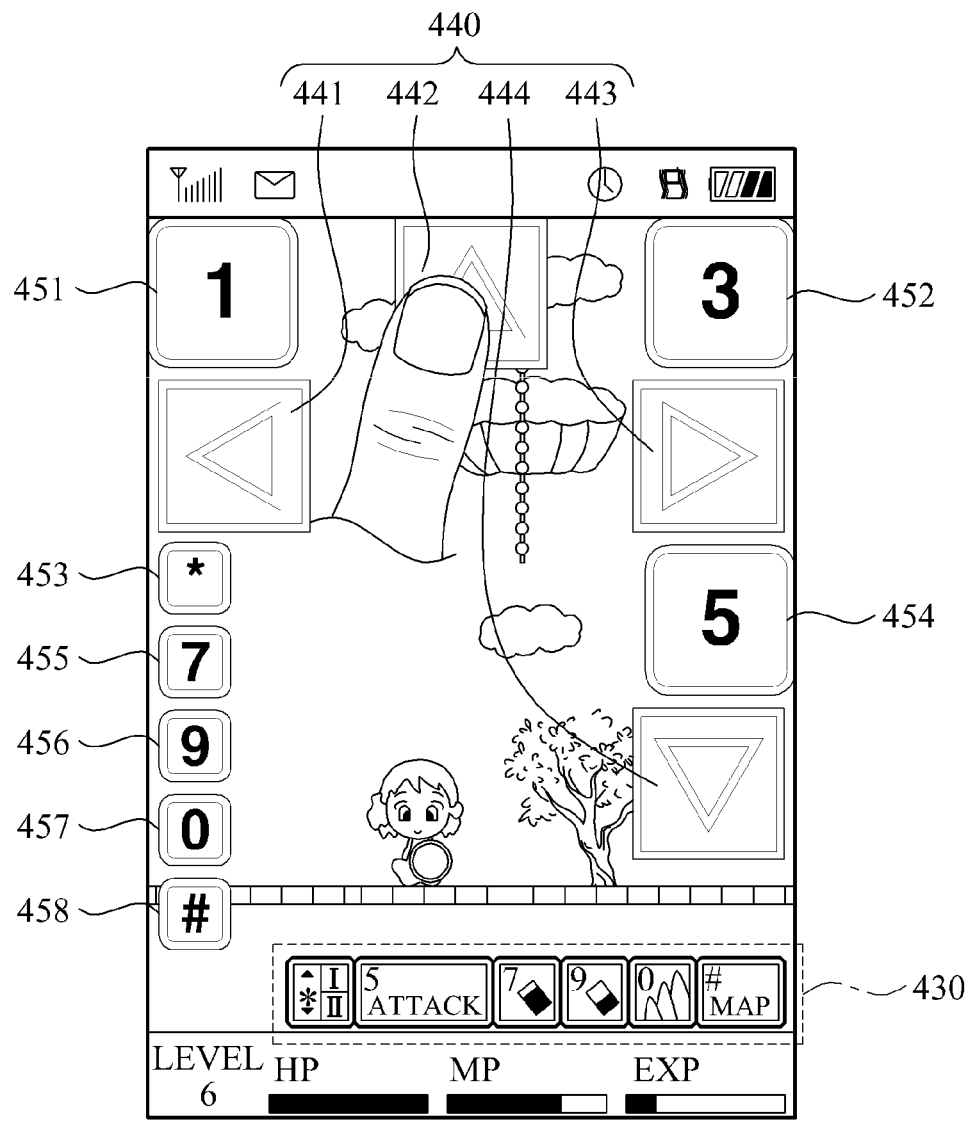

FIGS. 4A and 4B illustrate a process of providing a UI of when the GUI setting mode is an editing mode that sets an ergonomic space arrangement of at least one input key.

At least one GUI element according to an example embodiment may be displayed on a game graphic image, and depending on example embodiments, the at least one GUI element may be at least one input key used for controlling a game play on the touch screen display.

Referring to FIG. 4A, the at lest one GUI element may include at least one input key for controlling the game play including direction keys 411, 412, and 413 and operation keys 421 through 428 for a game play for each game contents.

Depending on example embodiments, the at least one GUI element may include a GUI element 430 for describing operations of the operation keys 421 through 428 to a game user.

When the GUI setting mode is an editing mode that sets an ergonomic space arrangement of the at least one input key, the user interface providing method may receive a second touch input for the ergonomic space arrangement, may update a space arrangement of the at least one input key in response to the received second touch input, and may activate the at least one input key.

Referring to FIGS. 4A and 4B, the user interface providing method may update and activate the direction keys 411, 412, and 413 and operation keys 421 through 428 by rearranging the space arrangement of the direction keys 411, 412, and 413 and operation keys 421 through 428 in response to the received second touch input.

Depending on example embodiments, the second touch input may be a drag and drop with respect to the direction keys 411, 412, and 413 and operation keys 421 through 428. That is, the operation of updating and activating of the direction keys 411, 412, and 413 and operation keys 421 through 428 by rearranging of the space arrangement of the direction keys 411, 412, and 413 and the operation keys 421 through 428 may be an operation of displaying a change from the first space arrangement to the second space arrangement with respect to the direction keys 411, 412, and 413 and the operation keys 421 through 428.

Particularly, the direction keys 411, 412, and 413 and the operation keys 421 through 428 in the first space arrangement of FIG. 4A may be respectively activated as direction keys 441, 442, and 443 and operation keys 451 through 458 in the second space arrangement of FIG. 4B, based on the space arrangement rearranged in response to the second touch input of the drag and drop.

Depending on example embodiments, the change from the first space arrangement to the second space arrangement may be controlled to be in proportion to a speed of the second touch input.

Referring again to FIG. 2, the user interface providing method may determine whether the GUI setting mode is an editing mode that adjusts a size of the at least one input key displayed by being overlapped on a game graphic image, based on the determination of the GUI setting mode, in operation 136.

When the GUI setting mode is determined as the editing mode that adjusts the size of the at least one input key, the user interface providing method may receive a second touch input for adjusting the size in operation 137.

Depending on example embodiments, the user interface providing method may update the size of the at least one input key in response to the received second touch input, and may activate the at least one input key in operation 143.

Depending on example embodiments, the change of the size of the at least one input key from a first size to a second size may be displayed in operation 143.

Hereinafter, a process of adjusting a size of a GUI element on the touch screen display according to an embodiment of the present invention will be described with reference to FIG. 5.

Figure 5:
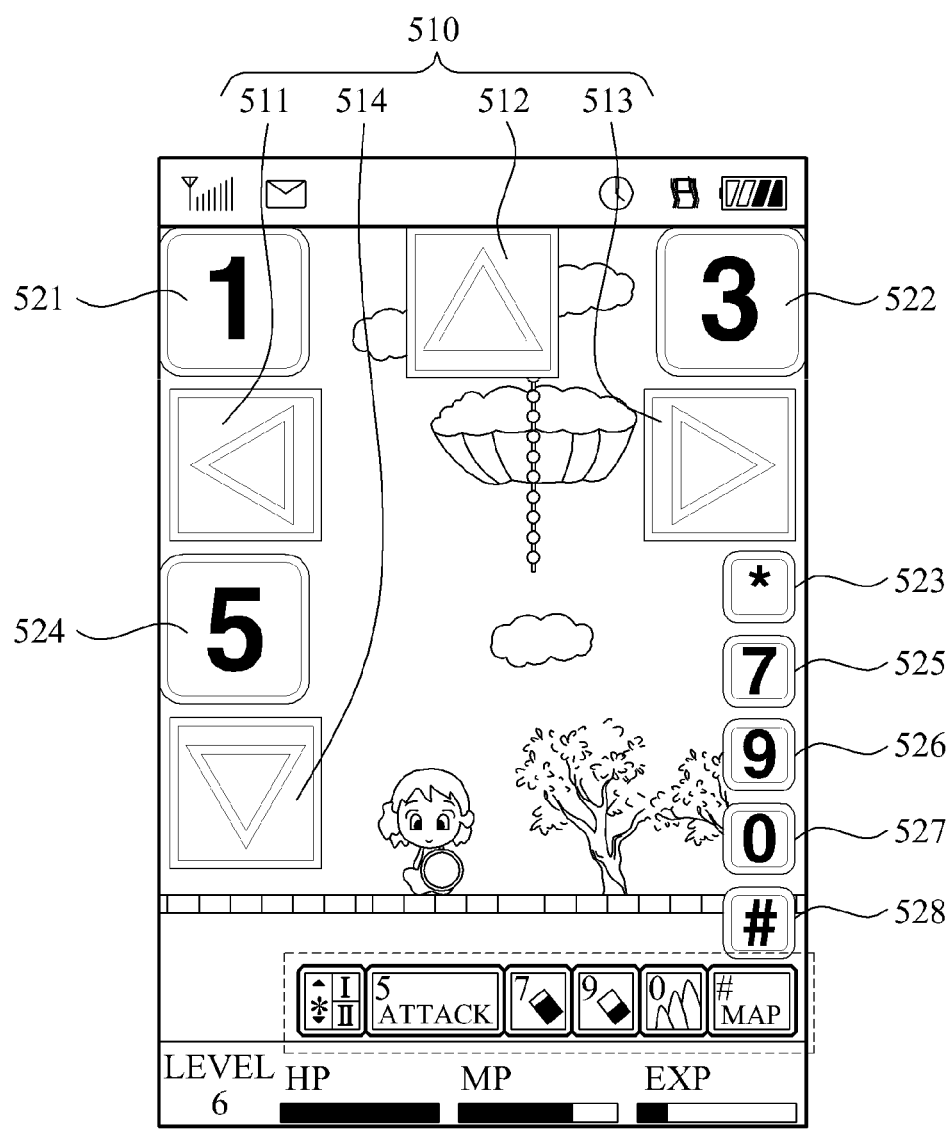
FIG. 5 is a diagram illustrating a process of providing a UI of when a GUI setting mode is an editing mode that sets a size of at least one input key according to an embodiment of the present invention.

FIG. 5 is a diagram illustrating a process of providing a UI of when a GUI setting mode is an editing mode that sets a size of at least one input key according to an embodiment of the present invention.

The at least one GUI element may be displayed on the game graphic image, and depending on example embodiments, the at least one GUI element may be at least one input key used for controlling a game play on a touch screen display.

Referring to FIG. 4A, the at least one GUI element may include at least one input key used for controlling a game play including direction keys 511, 512, and 513, and operation keys 521 through 528 for a game play for each game contents.

Depending on example embodiments, the at least one GUI element may include a GUI element 530 for describing operations of operation keys 521 through 528 to a game user.

When the GUI setting mode is an edition mode that adjusts the size of the at least one input key, the user interface providing method according to an example embodiment may receive a second touch input for adjusting the size, may update the size of the at least one input key in response to the received second touch input, and may activate the at least one input key.

Referring to FIG. 5, the user interface providing method may activate the direction keys 511, 512, and 513 and operation keys 521 through 528 by resetting sizes of the direction keys 511, 512, and 513, and the operation keys 521 through 528.

That is, the process of updating and activating the direction keys 511, 512, and 513 and operation keys 521 through 528 by resetting the sizes of the direction keys 511, 512, and 513, and the operation keys 521 through 528 may be an operation of displaying a change from a first size to a second size.

Depending on example embodiments, the GUI setting mode of the user interface providing method may be a setting mode selected with respect to a transparency, an ergonomic space arrangement, a size, or a combination thereof with respect to the at least one input key displayed by being overlapped on a game graphic image. Hereinafter, a setting mode selected with respect to a GUI element on the touch screen display according to an embodiment of the present invention will be described.

Figure 6A:
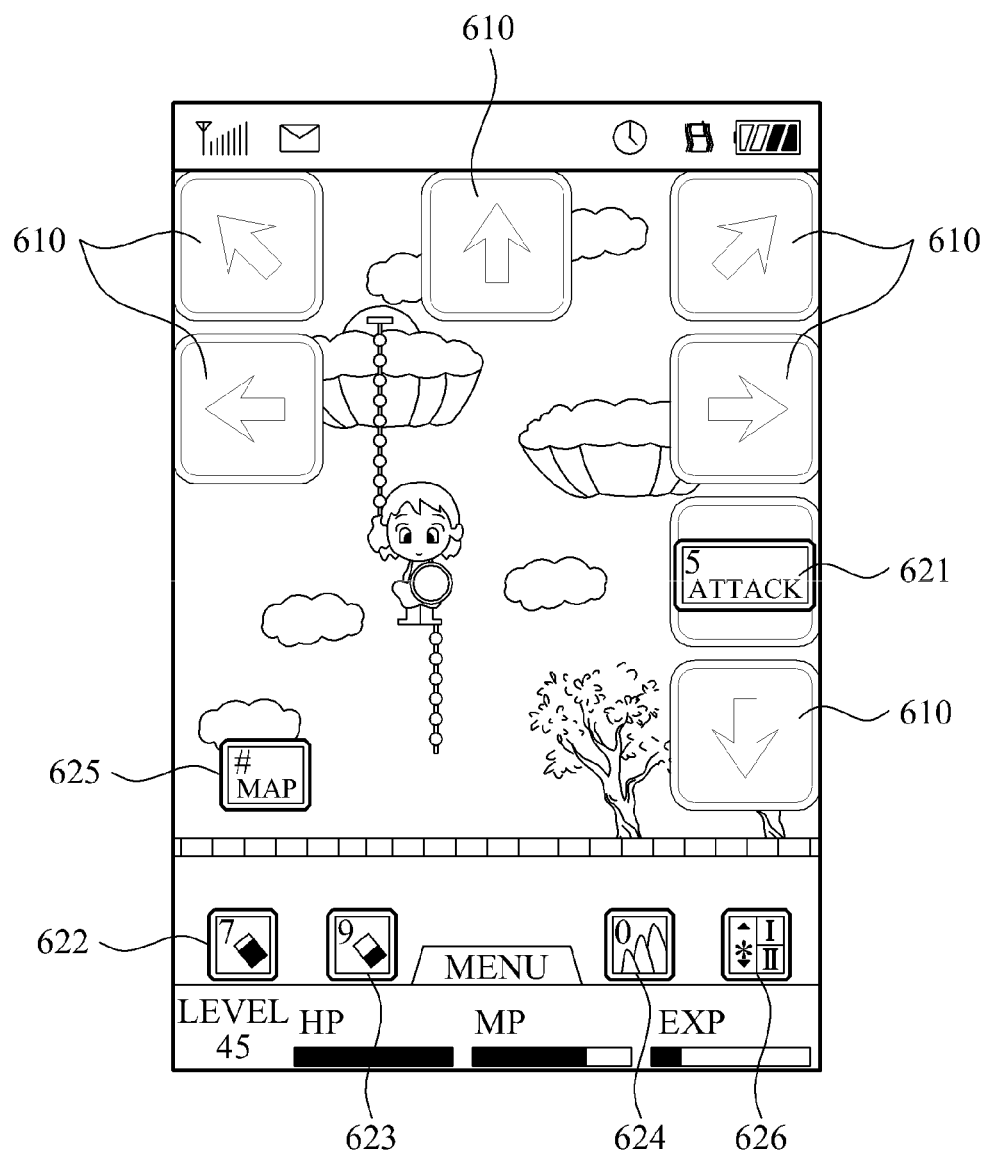
FIGS. 6A through 6C are diagrams illustrating a process of providing a UI of when a GUI setting mode is a two-hand mode of an ergonomic space arrangement based on a user's convenience of inputting a key according to an embodiment of the present invention.
Figure 6B:
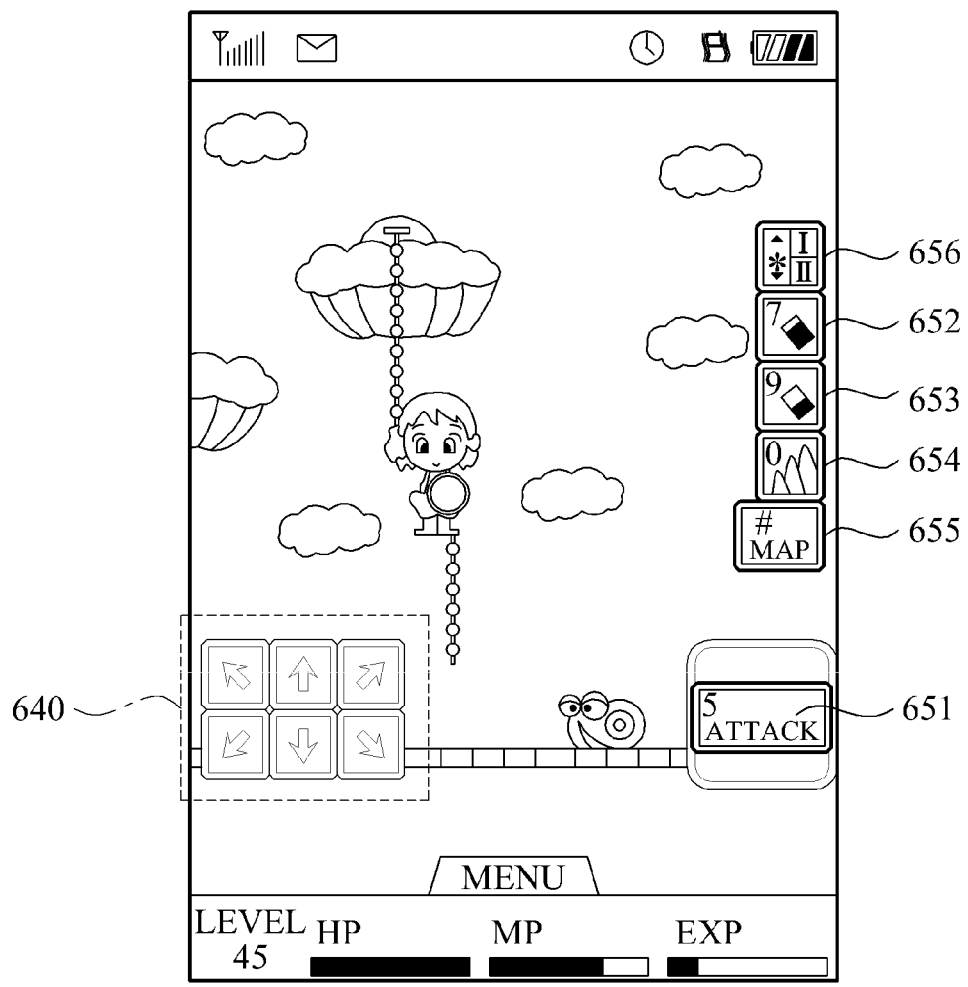
Figure 6C:
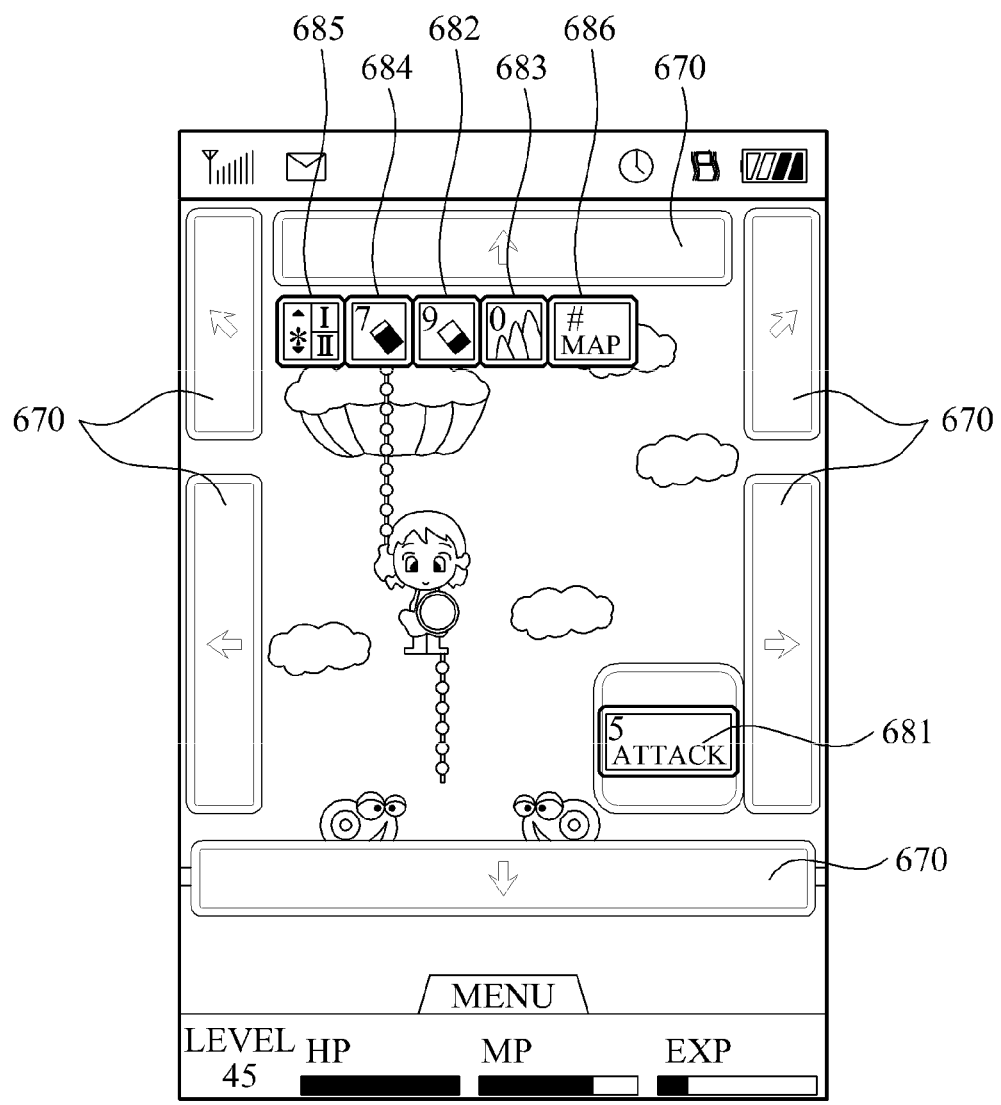

FIGS. 6A through 6C are diagrams illustrating a process of providing a UI of when a GUI setting mode is a two-hand mode of an ergonomic space arrangement that is based on a user's convenience of inputting a key according to an embodiment of the present invention At least one GUI element according to an embodiment of the present may be displayed on the game graphic image, and depending on example embodiments, the at least one GUI element may be at least one input key for controlling a game play on a touch screen display.

Referring to FIGS. 6A through 6C, the at least one GUI element may include at least one input key for controlling the game play including direction keys 610, 640, and 670 and operation keys 621 through 626 and 651 through 656, and 681 through 686 for a game play for each game contents.

When the GUI setting mode is a setting mode selected with respect to a two-hand mode of an ergonomic space arrangement that is based on a user's convenience of inputting a key, the user interface providing method according to an embodiment of the present invention may activate at least one input key in response to the selected two-hand mode.

Referring to FIGS. 6A through 6C, the user interface providing method according to an embodiment of the present invention may provide the direction keys 610, 640, and 670, that are at least one GUI element of the two-hand mode of various ergonomic space arrangement for user's convenience of inputting a key, and may provide the operation keys 621 through 626, 651 through 656, and 681 through 686 for the game play for each game contents.

Depending on game users who use two hands, preference for convenience of inputting of the key is different from each other as illustrated in FIGS. 6A through 6C, and thus, the two-hand mode may include, based on the preference of the game users, a predetermined ergonomic space arrangement with respect to the direction keys 610, 640, and 670 and operation keys 621 through 626, 651 through 656, and 681 through 686, for convenience of inputting the key for two hands.

Depending on example embodiments, the user interface providing method may provide a separate GUI element for selecting the two-hand mode to the game user.

Figure 7A:
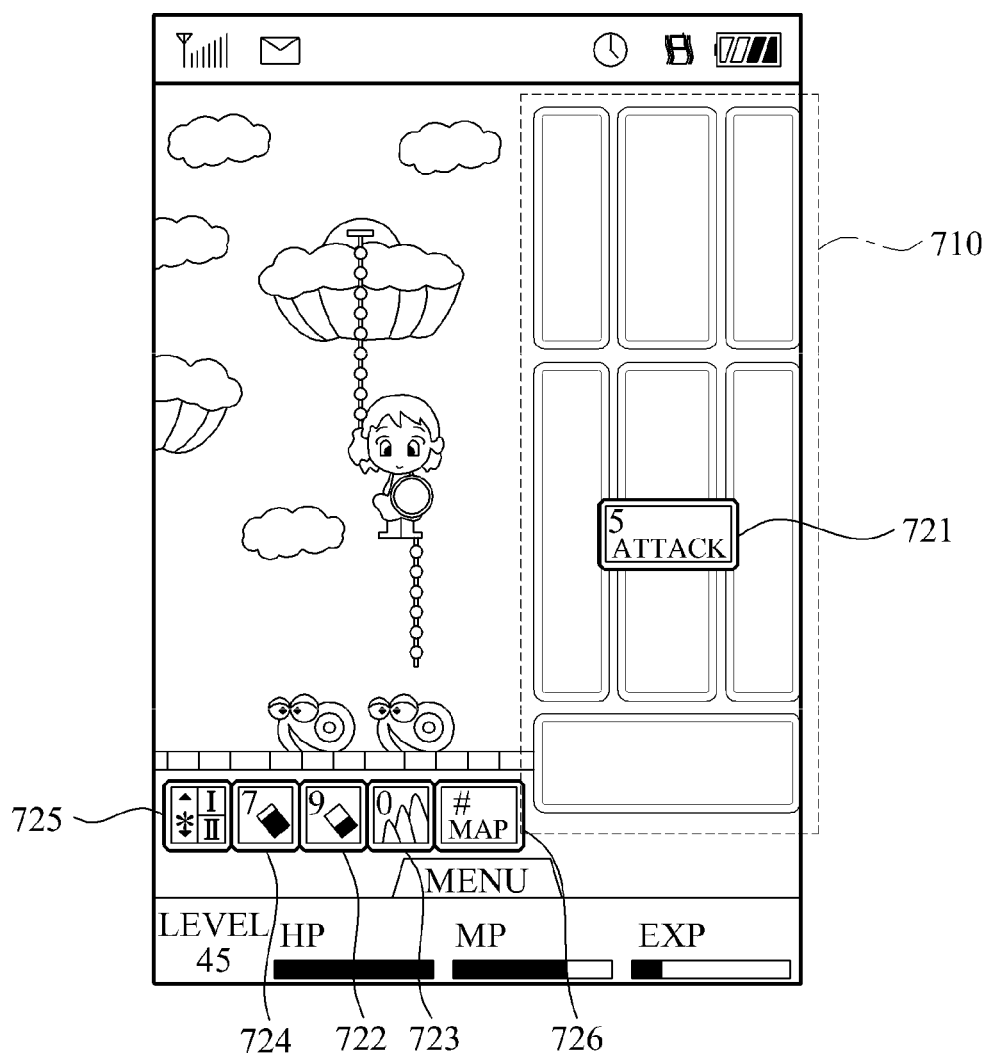
FIGS. 7A through 7C are diagrams illustrating a process of providing a UI of when a GUI setting mode is a one-hand mode of an ergonomic space arrangement based on a user's convenience of inputting a key according to an embodiment of the present invention.
Figure 7B:
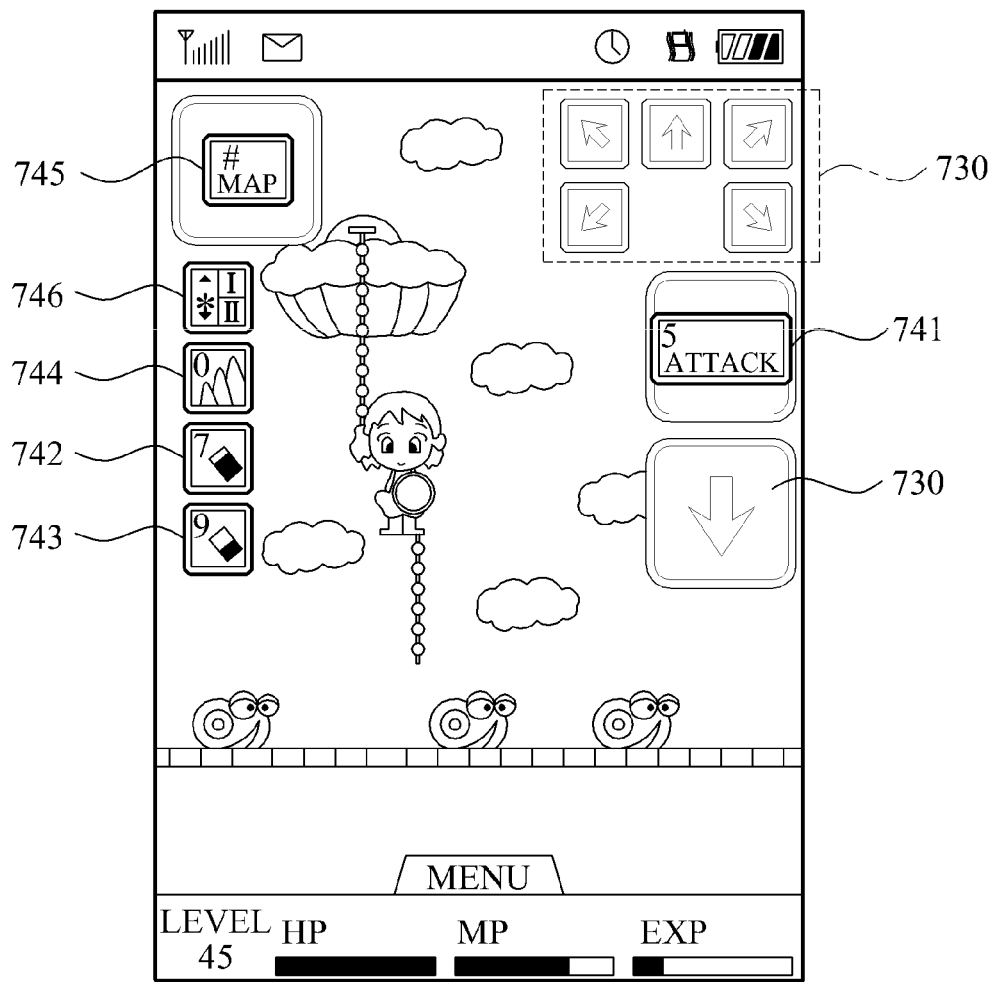
Figure 7C:
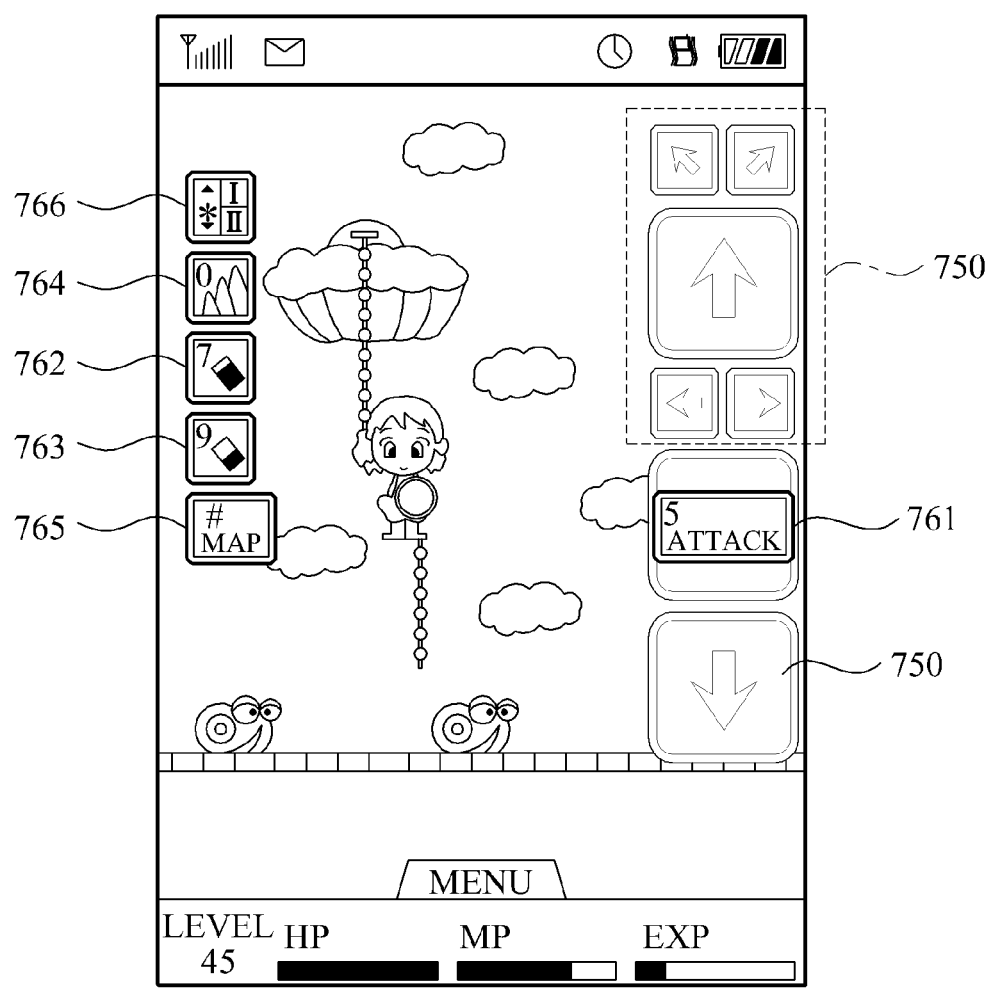

FIGS. 7A through 7C are diagrams illustrating a process of providing a UI of when a GUI setting mode is a one-hand mode of an ergonomic space arrangement based on a user's convenience of inputting a key according to an embodiment of the present invention.

At least one GUI element according to an embodiment of the present invention may be displayed on a game graphic image, and depending on example embodiments, the at least one GUI element may be at least one input key for controlling a game play on the touch screen display.

Referring to FIGS. 7A through 7C, the at least one GUI element may include at least one input key for controlling the game play including direction keys 710, 730, and 750, and operation keys 721 through 726, 741 through 746, and 761 through 766 for game play for each game contents.

When the GUI setting mode is a setting mode selected for a one-hand mode of the ergonomic space arrangement that is based on user's convenience of inputting a key, the user interface providing method according to an embodiment of the present invention may activate at least one input key in response to the selected one-hand mode.

Referring to FIGS. 7A through 7C, the user interface providing method according to an embodiment of the present invention may provide direction keys 710, 730, and 750 that are at least one GUI element of the one-hand mode of various ergonomic space arrangement and operation keys 721 through 726, 741 through 746, and 761 through 766 for game play for each game contents, for convenience of inputting a key.

That is, depending on game users who use one hand, preference for convenience of inputting a key is different from each other as illustrated in FIGS. 7A through 7C, and thus, the one-hand mode of the user interface providing method may include, based on the preference of the game users, predetermined ergonomic space arrangement with respect to direction keys 710, 730, and 750, and operation keys 721 through 726, 741 through 746, and 761 through 766, for the convenience of inputting the key for one hand.

Depending on example embodiments, the user interface providing method may provide a separate GUI element for selecting one-hand mode to the game user.

Figure 8:
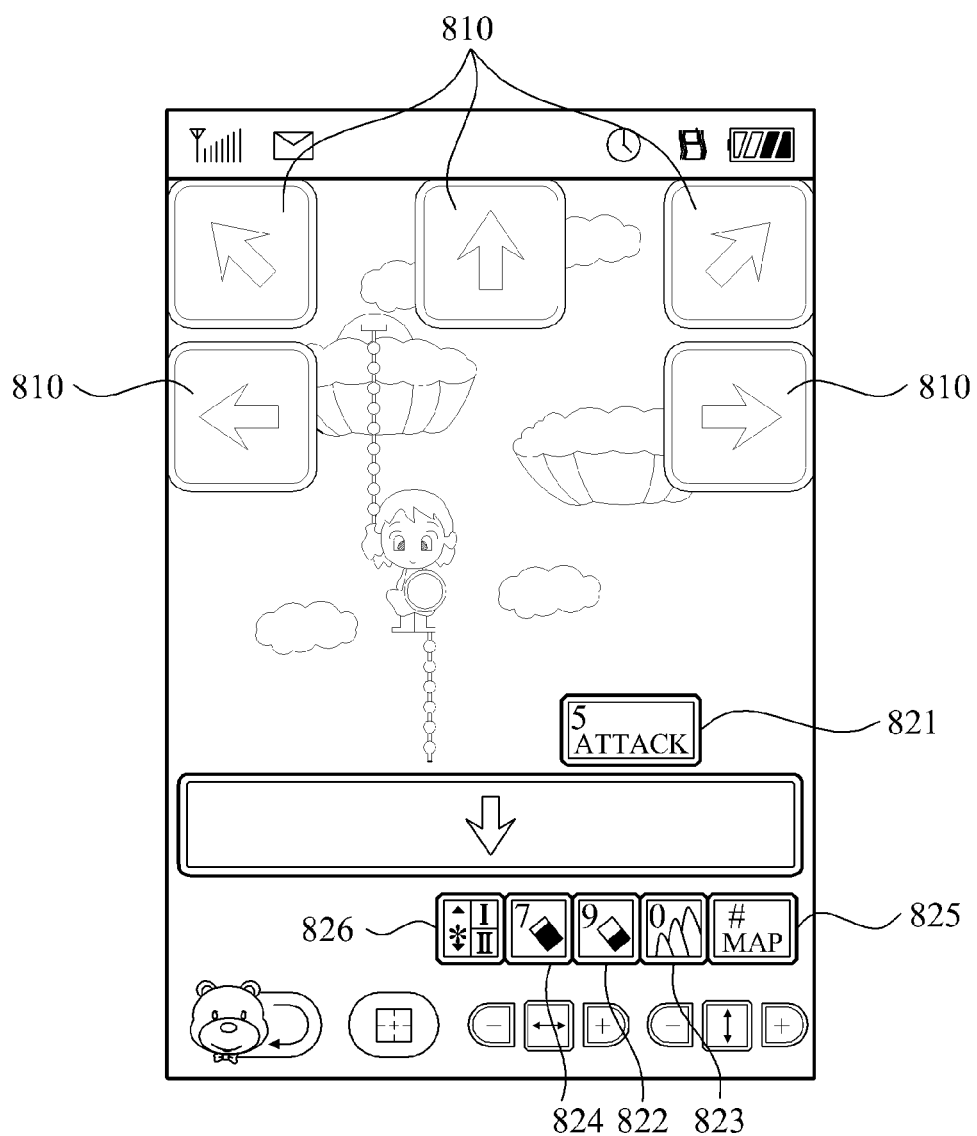
FIG. 8 is a diagram illustrating a grid element for setting a GUI element of a user interface providing method according to an embodiment of the present invention.

FIG. 8 is a diagram illustrating a grid element for setting a GUI element of a user interface providing method according to an embodiment of the present invention Referring to FIG. 8, the user interface providing method described above may provide the grid element on a graphic image to activate at least one GUI element in response to a GUI setting mode. That is, the user interface providing method may provide a guide reference for setting a direction key 810 and operation keys 821 through 826 that is at least one input key for controlling a game play in response to the GUI setting mode.

In FIG. 8, an ergonomic space arrangement and sizes of the direction key 810 and operation keys 821 through 826 are adjusted based on an interval unit of the grid element on the game graphic image.

Depending on example embodiments, the grid element may be overlapped on a touch screed display or may be displayed by being overlapped on a game graphic image.

The method according to the above-described example embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of providing a user interface to control a game play in a portable device including a touch screen display, the method comprising:
   receiving a first touch input on the touch screen display, the touch screen display displaying a game graphic image of the game play and a graphical user interface (GUI) overlaid on the image of the game play for controlling the game play;
   determining whether the received first touch input is a touch input for activating a GUI configuration mode for changing a setting of at least one GUI element displayed on the touch screen display or for controlling the game play, the at least one GUI element being selected by a touch on the at least one GUI element;
   determining the GUI configuration mode to activate based at least in part on a GUI setting of the at least one GUI element to be modified;
   receiving a second touch input on the touch screen display while the GUI configuration mode is activated; and
   updating the GUI setting of the at least one GUI element, the GUI element being utilized to control the game play, in response to the second touch input,
   wherein the at least one GUI element includes a plural of directional touch keys.

2. The method of claim 1, wherein the at least one GUI element is displayed on a game graphic image.

3. The method of claim 1, wherein the at least one GUI element includes at least one number key.

4. The method of claim 3, wherein the GUI setting comprises a transparency setting of the plural of directional touch keys that is displayed by being overlaid on the game graphic image.

5. The method of claim 4, further comprising:
displaying a transparency setting element on the touch screen display;
receiving the second touch input for setting the transparency; and
updating the transparency of the plural of directional touch keys in response to the received second touch input.

6. The method of claim 5, wherein the updating the transparency of the plural of directional touch keys comprises:
displaying a change in a transparency level from a first state to a second state.

7. The method of claim 6, wherein a degree of the transparency of the plural of directional touch keys is changed to be in proportion to a number of second touch inputs received on the touch screen display.

8. The method of claim 3, wherein the GUI setting comprises an ergonomic space arrangement with respect to the plural of directional touch keys displayed by being overlapped on the game graphic image.

9. The method of claim 8, further comprising:
receiving the second touch input for the ergonomic space arrangement; and
updating the ergonomic space arrangement of the plural of directional touch keys in response to the received second touch input.

10. The method of claim 9, wherein the second touch input is a drag and drop with respect to the plural of directional touch keys.

11. The method of claim 10, wherein the updating the ergonomic space arrangement of the plural of directional touch keys comprises:
displaying a change from a first space arrangement to a second space arrangement in response to the drag and drop.

12. The method of claim 11, wherein the change from the first space arrangement to the second arrangement is controlled to be in proportion to a speed of the second touch input.

13. The method of claim 3, wherein the GUI setting comprises a size of the plural of directional touch keys displayed by being overlapped on the game graphic image.

14. The method of claim 13, further comprising:
receiving the second touch input for adjusting the size; and
updating the size of the plural of directional touch keys, in response to the second touch input.

15. The method of claim 14, wherein the updating the size comprises displaying a change of the size of the plural of directional touch keys from a first size to a second size.

16. The method of claim 3, wherein the GUI setting comprises a combination of one or more of a transparency, an ergonomic space arrangement, or a size with respect to the plural of directional touch keys displayed by being overlapped on the game graphic image.

17. The method of claim 3, wherein the GUI setting comprises a setting of at least one of a one-hand mode or a two-hand mode of the ergonomic space arrangement with respect to the plural of directional touch keys on the touch screen display that is based on a user's convenience of inputting a key.

18. The method of claim 17, wherein the updating the GUI setting of the plural of directional touch keys activating one of the at least one of the one-hand mode or the two-hand mode.

19. A non-transitory computer-readable storage medium having stored thereon computer-executable instructions implementing the method of claim 1.

* * * * *